United States Patent
Sidelkovskiy et al.

(10) Patent No.: US 10,450,898 B2
(45) Date of Patent: Oct. 22, 2019

(54) TRACK FAIRING ASSEMBLY FOR A TURBINE ENGINE NACELLE

(71) Applicant: UNITED TECHNOLOGIES CORPORATION, Farmington, CT (US)

(72) Inventors: Dmitriy B. Sidelkovskiy, Ellington, CT (US); Steven H. Zysman, Amston, CT (US); Robert E. Malecki, Storrs, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 409 days.

(21) Appl. No.: 14/621,456

(22) Filed: Feb. 13, 2015

(65) Prior Publication Data
US 2016/0237856 A1 Aug. 18, 2016

(51) Int. Cl.
| | |
|---|---|
| B64D 29/06 | (2006.01) |
| F01D 25/28 | (2006.01) |
| B64D 29/00 | (2006.01) |
| F02K 1/52 | (2006.01) |
| F02K 1/72 | (2006.01) |
| F02C 7/20 | (2006.01) |
| F01D 25/24 | (2006.01) |

(52) U.S. Cl.
CPC ............ *F01D 25/28* (2013.01); *B64D 29/00* (2013.01); *B64D 29/06* (2013.01); *F01D 25/24* (2013.01); *F02C 7/20* (2013.01); *F02K 1/52* (2013.01); *F02K 1/72* (2013.01); *F05D 2240/55* (2013.01)

(58) Field of Classification Search
None
See application file for complete search history.

(56) References Cited

U.S. PATENT DOCUMENTS

| | | | |
|---|---|---|---|
| 8,074,440 B2 | 12/2011 | Kohlenberg et al. | |
| 2009/0053058 A1 | 2/2009 | Kohlenberg et al. | |
| 2012/0280082 A1* | 11/2012 | Calder | B64D 29/06 244/129.4 |
| 2014/0026582 A1 | 1/2014 | Beilliard et al. | |
| 2014/0116024 A1* | 5/2014 | Channel | F02K 1/72 60/226.2 |

(Continued)

FOREIGN PATENT DOCUMENTS

| | | |
|---|---|---|
| FR | 2991969 A1 | 12/2013 |
| WO | 2014151673 A1 | 9/2014 |

OTHER PUBLICATIONS

English Translation to Abstract of FR2991969.
(Continued)

*Primary Examiner* — Kayla Mccaffrey
(74) *Attorney, Agent, or Firm* — Cantor Colburn LLP

(57) ABSTRACT

The present disclosure relates generally to an aerodynamic track fairing assembly used on an engine nacelle, the track fairing assembly positionable on the aft section of the engine nacelle, the aerodynamic track fairing assembly including: an upper section extending toward an aft end of the aft section of the engine nacelle; a bottom section extending toward the aft end of the aft section of the engine nacelle, the bottom section affixed to the upper section to form a track cavity therebetween; and a fairing fitting disposed within the track cavity and affixed to the bottom section.

16 Claims, 3 Drawing Sheets

(56) References Cited

U.S. PATENT DOCUMENTS

2014/0234081 A1    8/2014   Amkraut et al.
2014/0318149 A1   10/2014   Guillon et al.

OTHER PUBLICATIONS

EP SR, dated Jul. 11, 2016.
EP Office Action fro Application No. 16 155 588.3; dated Jan. 18, 2019.

* cited by examiner

TRACK FAIRING ASSEMBLY FOR A TURBINE ENGINE NACELLE

TECHNICAL FIELD OF THE DISCLOSED EMBODIMENTS

The present disclosure is generally related to nacelles for turbine engines, and more particularly to a track fairing assembly for a turbine engine nacelle.

BACKGROUND OF THE DISCLOSED EMBODIMENTS

Gas turbine engines, such as those which power commercial and military aircraft, include a compressor to pressurize a supply of air, a combustor to burn a hydrocarbon fuel in the presence of the pressurized air, and a turbine to extract energy from the resultant combustion gases. Many known gas turbine engine assemblies include a nacelle that houses an engine. At least some known nacelles include a track fairing used to cover gaps and spaces between parts of an aircraft to reduce form drag and interference drag. Generally, the bottom surface of the track fairing is formed from two parts separated by a seal filled gap. The discontinuity of the bottom surface is not efficient to reduce drag and thus reduces fuel efficiency.

Improvements in track fairings are therefore needed in the art.

SUMMARY OF THE DISCLOSED EMBODIMENTS

In one aspect, an aerodynamic track fairing assembly is provided. The track fairing assembly is positionable on an aft section of an engine nacelle. In an embodiment, the track fairing assembly is positionable against an aft end of an engine pylon. The track fairing assembly includes an upper section, including an upper section aft end, extending toward an aft end of the aft section of the nacelle. The track fairing assembly further includes a bottom section, including a bottom section end and a bottom section interior surface, extending towards the aft end of the aft section of the nacelle. The upper section end is affixed to the bottom section end to form a track cavity between the upper section and the bottom section.

In one embodiment, a portion of the upper section includes a curvature. In a further embodiment, a portion of the bottom section includes a curvature.

The track fairing assembly further includes a fairing fitting disposed within the track cavity and affixed to the bottom section interior surface, and a pylon fitting disposed within track cavity; positioned adjacent to the fairing fitting; and affixed to the pylon. In another embodiment, the fairing fitting includes a substantially I-shaped cross-section. In an embodiment, the pylon fitting includes a substantially L-shaped cross section.

In an alternative embodiment, a seal is disposed adjacent to a gap formed between fairing fitting and the pylon fitting.

In one aspect, a gas turbine engine is provided. The gas turbine engine includes a nacelle including an aft section, and aerodynamic track fairing assembly positionable on the aft section of the nacelle, the aerodynamic track fairing including an upper section extending toward an aft end of the aft section of the nacelle, the upper portion including an upper portion end, a bottom section extending toward the aft end of the aft section of the nacelle, the bottom section including a bottom section end, and a bottom section interior surface, wherein the upper section end is affixed to bottom section end to form a track cavity between the upper section and the bottom section a fairing fitting disposed within the track cavity and affixed to the bottom section interior surface.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
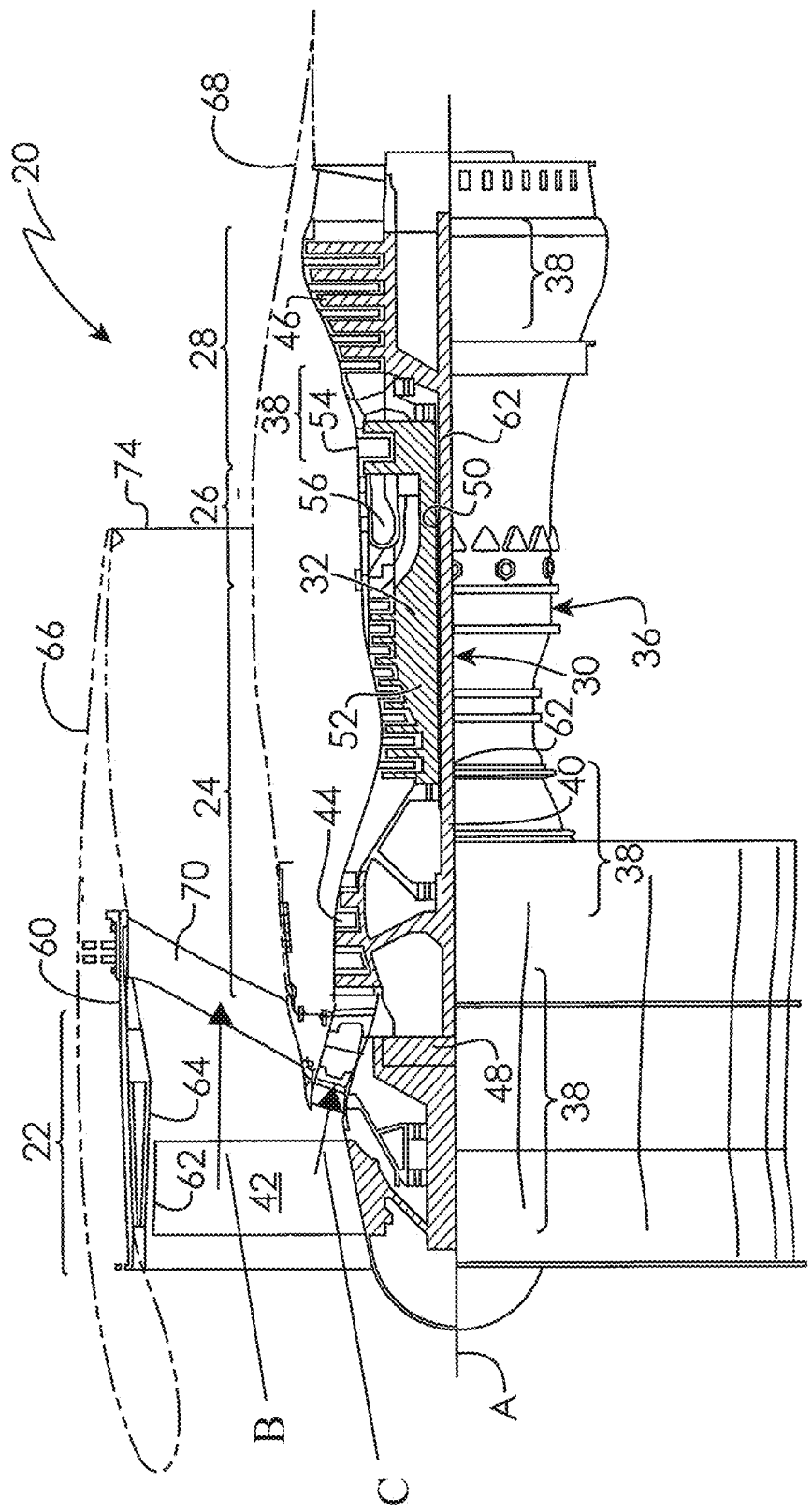
FIG. 1 is a sectional view of one example of a gas turbine engine in which the presently disclosed embodiments may be used.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 shows a gas turbine engine 20, such as a gas turbine used for power generation or propulsion, circumferentially disposed about an engine centerline, or axial centerline axis A. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R.)/(518.7°\ R)]^{0.5}$. The "Low corrected fan tip speed" as disclosed herein according to one non-limiting embodiment is less than about 1150 ft/second (350.5 m/sec).

The fan section 22 generally includes a fan containment case 60 within which the fan blades 42 are contained. Tips 62 of the fan blades 42 run in close proximity to an inboard surface 64 of the fan containment case 60. The fan containment case 60 is enclosed within an aerodynamic fan nacelle 66 (illustrated schematically) that at least partially surrounds an aerodynamic core nacelle 68 (illustrated schematically). The fan containment case 60 and aerodynamic fan nacelle 66 are supported by circumferentially spaced structures 70 often referred to as Fan Exit Guide Vanes (FEGVs).

The bypass flowpath is defined between the core nacelle 68 and the fan nacelle 66. The engine 20 generates a high bypass flow arrangement with a bypass ratio in which approximately eighty percent of the airflow which enters the fan nacelle 66 becomes bypass airflow through the bypass flowpath. The bypass flow communicates through the generally annular bypass flow path and is discharged through a nozzle exit area 74.

Figure 2:
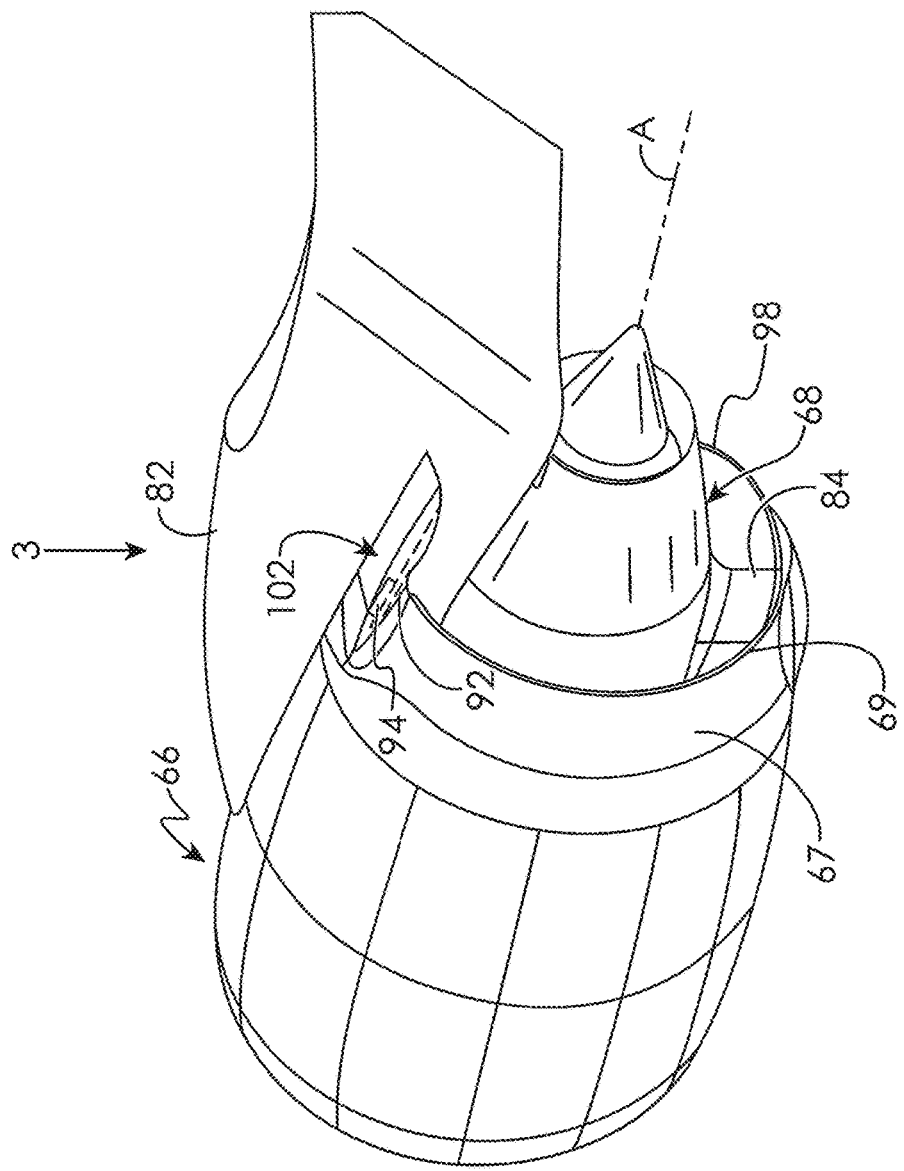
FIG. 2 is a perspective view of a gas turbine engine in which the presently disclosed embodiments may be used.

With reference to FIG. 2, the fan nacelle 66 includes an aft section 67 having an aft end 69. The fan nacelle 66 interfaces with an engine pylon 82 and a Bi-Fi splitter 84. The engine pylon 82 is adapted to mount the engine 20 to an aircraft airframe such as, for example, an aircraft fuselage, an aircraft wing, etc. The Bi-Fi splitter 84 extends radially to interconnect the fan nacelle 66 and the core nacelle 68 to provide communication there between for oil lines, conduits, wire harnesses, etc.

The fan nacelle 66 may also contain a thrust reverser system (not shown). Each fan nacelle 66 axially slides fore and aft along respective track assemblies 92 (illustrated schematically) generally located adjacent the engine pylon 82 and the Bi-Fi splitter 84. One or more actuators 94 (illustrated schematically) provide the motive force to operate the thrust reverser system. Each of the track assemblies 92 are at least partially surrounded by an aerodynamic track fairing 102 which are often referred to as a 'beaver tail'.

The aerodynamic track fairing 102 at least partially defines an outer aerodynamic surface profile of the fan nacelle 66 to at least partially accommodate the thrust reverser system. That is, the aerodynamic track fairing 102 at least partially encloses each of the track assemblies 92 and/or the actuator 94. Alternatively, or in addition the aerodynamic track fairing 102 may be located on a lower surface of the fan nacelle 66 adjacent to the Bi-Fi splitter 84. That is, the aerodynamic track fairing 102 extends beyond the trailing edge 98 of the fan nacelle 66.

Figure 4:
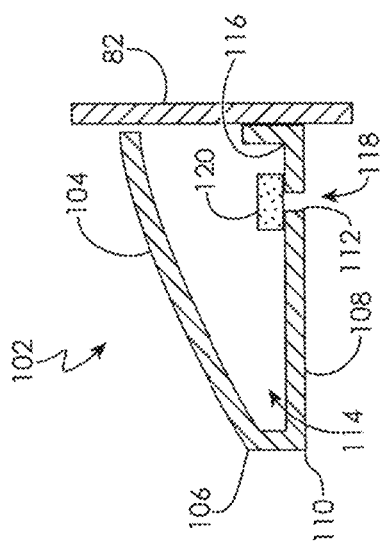
FIG. 4 is a cross-sectional view of a track fairing.
Figure 3:
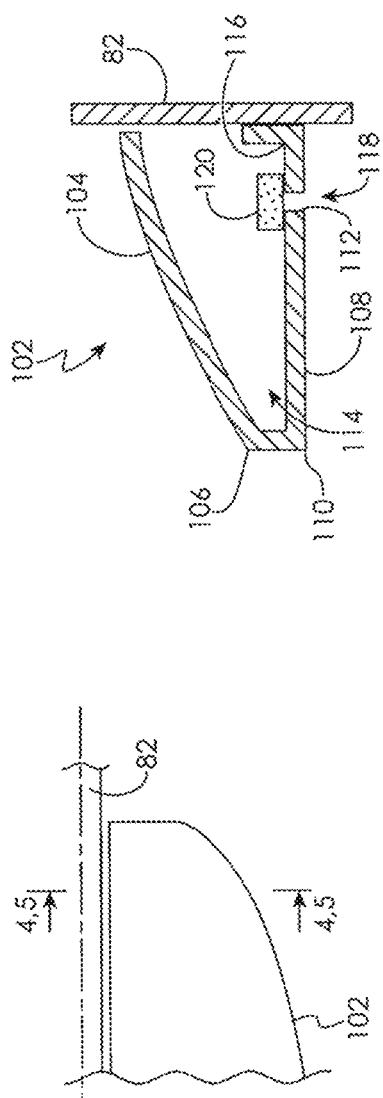
FIG. 3 is a top view of a track fairing used on a gas turbine engine according to one embodiment of the present disclosure.

FIG. 3 illustrates a top view of the aerodynamic track fairing 102 and the pylon 82. FIG. 4 illustrates a rotated cross sectional view of the aerodynamic track fairing 102 and the pylon 82 according to another embodiment. The aerodynamic track fairing 102 is formed from a unitary piece including a curved upper portion 104 extending toward the aft end of the pylon 82, the curved upper portion including an upper first end 106. An essentially flat lower portion 108 extends toward the aft end of the pylon 82, the essentially flat lower portion 108 including a lower portion first end 110 and a lower portion second end 112, wherein upper aft end 106 is extended from the lower aft end 110 to form a track cavity 114 between the curved upper portion 104 and the essentially flat lower portion 108. A pylon fitting 116 is affixed to the pylon 82 and positioned adjacent to the lower portion forward end 112 to form a gap 118 therebetween. A seal 120 is disposed adjacent to the gap 118 to prevent air from entering the cavity 114. During operation of the turbine engine 20 on an aircraft (not shown), air passes over the aerodynamic track fairing 102 causing deflection of the essentially flat lower portion 108 in relation to the pylon fitting 116; thus creating additional drag and reducing fuel efficiency of the turbine engine 20.

Figure 5:
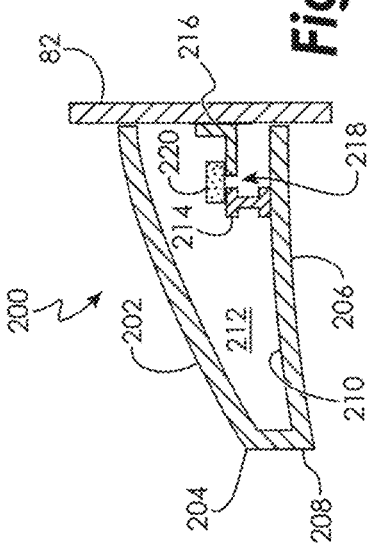
FIG. 5 is a cross-sectional view of a track fairing according to one embodiment.

FIG. 5 illustrates an embodiment of an aerodynamic track fairing assembly 200 in accordance with the present disclosure. The aerodynamic track fairing assembly 200 includes an upper section 202 extending toward the aft end 69 of the aft section 67 of the fan nacelle 66, the upper section 202 including an upper section end 204. In one embodiment, a portion of the upper section 202 includes a curvature. The aerodynamic track fairing assembly 200 further includes a bottom section 206 extending toward the aft end 69 of the aft section 67 of the fan nacelle 66, the bottom section 206 including a bottom section end 208 and a bottom section interior surface 210. In the illustrated embodiment of FIG. 5, a portion of the bottom section 206 includes a curvature. The upper section end 204 is affixed to the bottom section end 208 to form a track cavity 212 between the upper section 202 and the bottom section 206. It will be appreciated that the upper section 202 and bottom section 206 may be formed from a unitary piece of material or be formed by combining two separate pieces.

The aerodynamic track fairing assembly 200 further includes a fairing fitting 214 disposed within the track cavity 212 and affixed to the bottom section interior surface 210. In one embodiment, as shown in FIG. 5, the fairing fitting 214 includes a substantially I-shaped cross-section. Although, it will be appreciated that the fairing fitting 214 may be formed in any shape.

In the illustrated embodiment of FIG. 5, the aerodynamic track fairing assembly 200 is positionable against an aft end of an engine pylon 82, and further includes a pylon fitting 216 disposed within track cavity 212 positioned adjacent to the fairing fitting 214 and affixed to the pylon 82. In one embodiment, as shown in FIG. 5, the pylon fitting 216 includes a substantially L-shaped cross section, although it will be appreciated that the pylon fitting 216 may be formed in any shape. In the embodiment shown, a seal 220 is disposed adjacent to a gap 218 formed between fairing fitting 214 and the pylon fitting 216.

It will be appreciated that relative positional terms such as "forward," "aft," "upper," and "lower" and the like are with reference to the normal operational attitude of the vehicle and should not be considered otherwise limiting.

It will be appreciated that track fairing assembly 200 includes the fairing fitting 214 and the pylon fitting 216 disposed within the track cavity 212 to enable the bottom section 206 to be have a continuous surface. The continuous surface on the bottom section 206 reduces the deflection in relation to the pylon 82, thus reducing the drag and improving fuel efficiency.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A turbine engine nacelle including an aft section comprising:
   an aerodynamic track fairing assembly located on the aft section of the nacelle, the aerodynamic track fairing comprising:
   an upper section extending toward an aft end of the aft section of the nacelle, the upper section including an upper portion end;
   a bottom section extending toward the aft end of the aft section of the nacelle, the bottom section including a bottom section end, and a bottom section interior surface;
   wherein the upper portion end is affixed to bottom section end to form a track cavity between the upper section and the bottom section;
   a fairing fitting disposed within the track cavity and affixed to the bottom section interior surface, wherein the fairing fitting is enclosed by the upper section and the bottom section; and
   a pylon fitting affixed to the engine pylon, wherein the pylon fitting is disposed within the track cavity and located adjacent to the fairing fitting.

2. The nacelle of claim 1, wherein the aerodynamic track fairing assembly is positionable against an aft end of an engine pylon.

3. The nacelle of claim 1, wherein a gap is formed between the pylon fitting and the fairing fitting.

4. The nacelle of claim 3, further comprising a seal disposed adjacent to the gap.

5. The nacelle of claim 1, wherein a portion of the upper section includes a curvature.

6. The nacelle of claim 1, wherein a portion of the bottom section includes a curvature.

7. A turbine engine nacelle including an aft comprising:
   an aerodynamic track fairing assembly located on the aft section of the nacelle, the aerodynamic track fairing comprising:
   an upper section extending toward an aft end of the aft section of the nacelle, the upper section including an upper portion end;
   a bottom section extending toward the aft end of the aft section of the nacelle, the bottom section including a bottom section end, and a bottom section interior surface;
   wherein the upper portion end is affixed to bottom section end to form a track cavity between the upper section and the bottom section;
   a fairing fitting disposed within the track cavity and affixed to the bottom section interior surface, wherein the fairing fitting is enclosed by the upper section and the bottom section, wherein the siring fitting comprises a substantially I-shaped cross-section.

8. A turbine engine nacelle including an aft section comprising:
   an aerodynamic track fairing assembly located on the aft section of the nacelle, the aerodynamic track fairing comprising:
   an upper section extending toward an aft end of the aft section of the nacelle, the upper section including an upper portion end;
   a bottom section extending toward the aft end of the aft section of the nacelle, the bottom section including a bottom section end, and a bottom section interior surface;
   wherein the upper portion end is affixes to bottom section end to form a track cavity between the upper section and the bottom section;
   a fairing fitting disposed within the track cavity and affixed to the bottom section interior surface, wherein the fairing fitting is enclosed by the upper section and the bottom section, wherein the pylon fitting comprises a substantially L-shaped cross section.

9. A gas turbine engine comprising:

a nacelle including an aft section; and an aerodynamic track fairing assembly located on the aft section of the nacelle, the aerodynamic track fairing comprising:

an upper section extending toward an aft end of the aft section of the nacelle, the upper section including an upper portion aft end;

a bottom section extending toward the aft end of the aft section of the nacelle, the bottom section including a bottom section aft end, and a bottom section interior surface;

wherein the upper portion end is affixed to bottom section aft end to form a track cavity between the upper section and the bottom section;

a fairing fitting disposed within the track cavity and affixed to the bottom section interior surface, wherein the fairing fitting is enclosed by the upper section and the bottom section; and a pylon fitting affixed to the engine pylon, wherein the pylon fitting is disposed within the track cavity and located adjacent to the fairing fitting.

10. The gas turbine engine of claim 9, wherein the aerodynamic track fairing assembly is positionable against an aft end of an engine pylon.

11. The gas turbine engine of claim 9, wherein a gap is formed between the pylon fitting and the fairing fitting.

12. The gas turbine engine of claim 11, further comprising a seal disposed adjacent to the gap.

13. The gas turbine engine of claim 9, wherein a portion of the upper section includes a curvature.

14. The gas turbine engine of claim 9, wherein a portion of the bottom section includes a curvature.

15. The gas turbine engine of claim 9, wherein the fairing fitting comprises a substantially I-shaped cross-section.

16. The gas turbine engine of claim 9, wherein the pylon fitting comprises a substantially L-shaped cross section.

* * * * *